United States Patent
Aoshima

[19]

[11] Patent Number: 5,900,940
[45] Date of Patent: May 4, 1999

[54] POSITION DETECTOR FOR CHIP MOUNTER

[75] Inventor: Yasuaki Aoshima, Iwata, Japan

[73] Assignee: Yamaha Hatsudoki Kabushiki Kaisha, Iwata, Japan

[21] Appl. No.: 08/812,735

[22] Filed: Mar. 6, 1997

[30] Foreign Application Priority Data

Nov. 28, 1995 [JP] Japan .................................. 7-309494
Mar. 11, 1996 [JP] Japan .................................. 8-301723

[51] Int. Cl.$^6$ ................................................ G01B 11/00
[52] U.S. Cl. ...................... 356/375; 250/559.34; 356/385
[58] Field of Search .................................. 356/375, 376, 356/383–388; 29/720, 721, 740, 741, 759; 414/783; 348/87; 250/559.12, 559.36, 559.29, 559.34, 599.16

[56] References Cited

U.S. PATENT DOCUMENTS

| | | | |
|---|---|---|---|
| 3,781,115 | 12/1973 | Rader et al. ............................. | 356/386 |
| 4,559,452 | 12/1985 | Igaki et al. ............................. | 356/386 |
| 5,467,186 | 11/1995 | Indo et al. ............................. | 356/375 |
| 5,559,727 | 9/1996 | Deley et al. ............................. | 356/375 |
| 5,570,993 | 11/1996 | Onodera et al. ........................ | 356/375 |
| 5,619,528 | 4/1997 | Sakurai .................................. | 356/375 |

*Primary Examiner*—Hoa Q. Pham
*Attorney, Agent, or Firm*—Knobbe, Martens, Olson & Bear LLP

[57] ABSTRACT

A method and apparatus for accurately determining the location of a component picked up by a pickup device for facilitating accurate mounting of the component. The method employs an arrangement wherein diffusion-type light sources can be employed and the coordinates of the corners of the component are determined by measuring the shifting of the shadow of the component on a receptor by illuminating the light sources in sequence. In some instances, the accuracy of the measurement can be improved by rotating the component this being particularly useful if the component has a shape that deviates greatly from a square shape.

25 Claims, 10 Drawing Sheets

POSITION DETECTOR FOR CHIP MOUNTER

BACKGROUND OF THE INVENTION

This invention relates to a position detector and more particularly to an improved position measuring apparatus and method of accurately locating components for use in placement apparatus such as chip mounters.

There is a considerable demand for devices that are capable of mounting or positioning small components such as integrated circuits, resistors, capacitors and the like at accurate locations on substrates such as printed circuit boards. This type of apparatus is generally referred to as a "chip" or "surface" mounter.

The components that are positioned are generally fed to the apparatus at a feeder location. Frequently, the components are positioned in specially-formed tapes that form individual pockets in which the components are received. Tape feeders present these components to a pickup device which then picks them up and positions them on the substrate.

At one time, these components were accurately positioned on the pickup apparatus by gripping fingers or other devices that physically engaged the component and would shift the component to a corrected position before placement. Many types of components do not, however, lend themselves to handling in this manner.

Therefore, a wide variety of types of non-contact sensors have been employed. These sensors sense the actual position of the component as picked up by the pickup device. By being able to determine the actual position of the component, then correction in its position can be made when the component is positioned on the substrate.

This invention deals primarily with such a non-contact type of sensing arrangement and method. One type of arrangement which is conventionally utilized for providing this sensing utilizes a plurality of laser-type light sources that operate through optical devices to cast a plurality of parallel light rays across a sensing station in which the component and its pickup device is positioned. A receptor is disposed on the other side of the pickup device and held component and a shadow is cast on that receptor. By rotating the component in the path of the light rays it is possible to measure from the shifting and size of the shadow the actual position of the component. These types of devices can be quite accurate.

However, they are also quite expensive. They require a plurality of laser light sources and frequently require in addition to a laser generator, a condenser lens, a mirror and a parallel light-forming lens all of which add to the cost of the apparatus.

It is, therefore, a principal object of this invention to provide an improved arrangement wherein a more simple light source can be employed for accurately determining the position of a component as picked up by a pickup device.

It is a further object of this invention to provide an improved low-cost sensor and sensing method for such applications.

In conjunction with the detecting of the component position and as has been noted, frequently a procedure is utilized that involves the rotation of the component and its pickup device in a sensing station. Although this procedure may be carried out during the time when the component is being transported, it nevertheless can be time-consuming. In addition, if the rotational movements are made rapidly or abruptly, they may actually cause the component to shift or in extreme cases become displaced from the pickup device.

It is, therefore, a still further object of this invention to provide an improved detecting method and apparatus for determining the position of a component which does not necessarily require rotation of the component.

It is a further object of this invention to provide an improved detecting apparatus and method wherein no relative movement need be required in order to provide a determination of the condition of the component relative to its pickup device.

One type of rotational methodology employed involves rotating the component to a position where the shadow which it casts has a minimum width. With rectangular components this permits determination of when an end of the component is perpendicular to the light sources. However since the initial position of the component may vary, the time to accomplish this step varies from component to component. Thus the apparatus must be capable of adjustment in its time sequence. This greatly complicates programming of the apparatus.

It is therefore a further object of this invention to provide a position determining method and apparatus that can operate on a fixed rather than variable time sequence.

SUMMARY OF THE INVENTION

This invention is adapted to be embodied in a detecting method and apparatus for determining the position of a component that is picked up by a pickup device. In accordance with the method, the component is positioned by the pickup device in a sensing station between a light receptor and a diffusion-type light source that is spaced at a known transverse distance and between the light source and the receptor. When the light source is illuminated a shadow will be cast on the receptor by the component. Relative movement between the source of light and the component is then effected in a path parallel to the plane of the detector. The shift in location of the shadow on the detector is utilized with other known parameters to determine the position of an edge of the component relative to the pickup device.

BRIEF DESCRIPTION OF THE DRAWINGS

FIG. 6 is a view showing how the sensing of the location of one corner position of the component is determined.

FIG. 7 is a view, in part similar to FIG. 6, showing the determination method for a second corner.

FIG. 8 is a graphical view showing the determination of one of the offsets for a third corner.

FIG. 9 is a graphical view showing why it is preferred to rotate the component in order to obtain one of the coordinates for rectangular components that are not square.

FIG. 10 is a graphical view showing how the other coordinate of the first corner is also determined.

FIG. 11 is a graphical view showing how the other coordinate of the third corner is located.

FIG. 12 is a view showing how the other coordinate of the second corner is determined.

DETAILED DESCRIPTION OF THE PREFERRED EMBODIMENTS OF THE INVENTION

Figure 1:
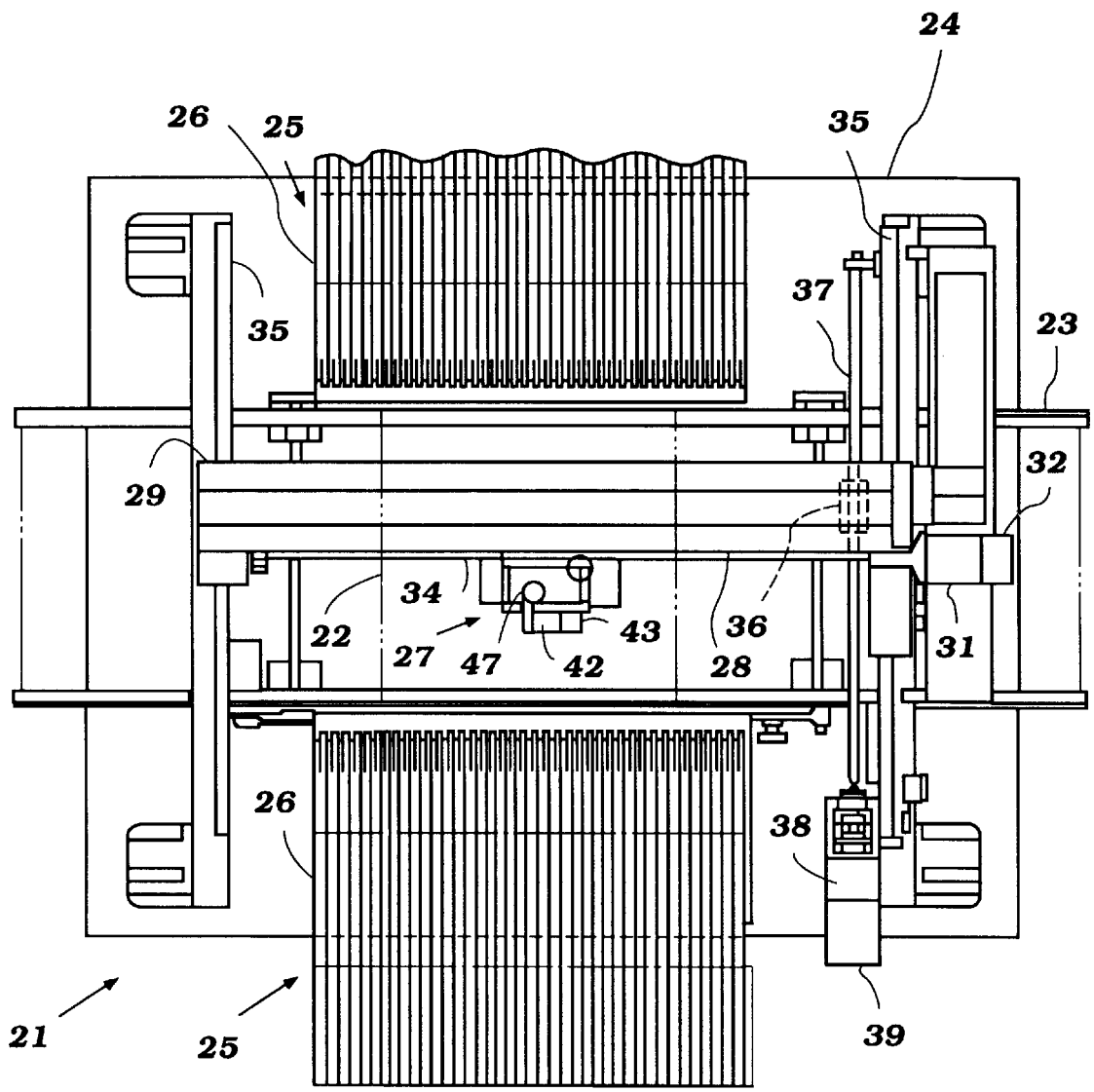
FIG. 1 is a top plan view of a mounting apparatus constructed and operated in accordance with an embodiment of the invention.
Figure 2:
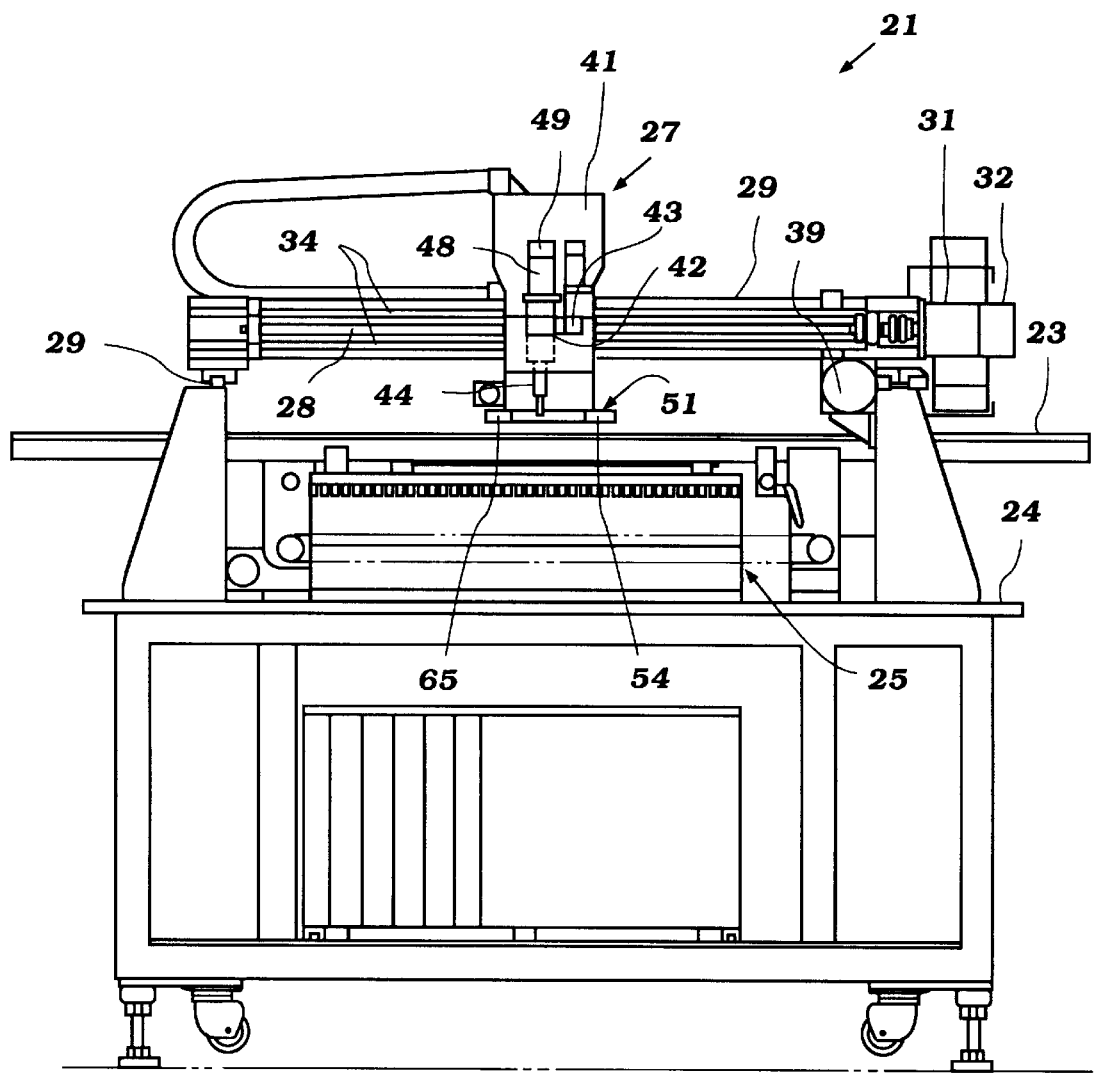
FIG. 2 is a front elevational view of the apparatus.

Referring now in detail to the drawings and initially to FIGS. 1 and 2, a chip mounting apparatus constructed and operated in accordance with an embodiment of the invention is identified generally by the reference numeral 21. The chip mounting apparatus 21 is adapted to mount small components such as IC's, resistors or capacitors on printed circuit boards 22 that are presented to a mounting station by a conveyor 23 which conveyor extends transversely across a table 24 of the apparatus 21.

These individual components are presented at delivery stations 25 that are positioned at opposite sides of the conveyor 23 and which are comprised of a plurality of individual ratchet operated tape feeders 26. These types of devices are well known and each is comprised of a carrying tape having individual pockets in which the individual components are positioned. The actual pick up or delivery stations 25 are positioned closely adjacent opposite sides of the conveyor 23.

A pick up head assembly, indicated generally by the reference numeral 27 and having a construction that will be described is mounted for movement between the delivery stations 25 and the circuit board 22 for picking up the components and depositing them. In addition, certain other operations will be described later.

The head assembly 27 has a ball nut (not shown) that is drivingly engaged with a feed screw 28 which is, in turn, rotatably carried on a carriage 29. Rotation of the feed screw 28 moves the head assembly 27 in the X—X direction. A driving motor 31 is provided at one end of the carriage 29 for driving the feed screw 28. An encoder 32 is driven by the motor 31 and provides a signal to a control unit, indicated generally by the reference numeral 33 and as shown in the schematic view of FIG. 5. This figure shows the interrelationship of various components. Guide rails 34 are also provided on the carriage 29 for guiding the movement of the head assembly 27 in the X—X direction.

The carriage 29 is itself moveable along the Y axis being mounted for this movement on a pair of parallel guide rails 35 that extend on opposite sides of the feeder stations 25 and perpendicularly to the path of the conveyor 23. The carriage 29 has a ball nut 36 that is engaged with a Y axis drive screw 37 which is journalled appropriately on the mechanism 21 and which is driven by an electric drive motor 38. An encoder 39 is coupled for rotation with the Y axis drive motor 38 so as to provide a signal indicative of the position of the pick up head assembly 27 in the Y axis.

The head assembly 27 will now be described in detail by primary reference to FIGS. 1 and 2 and the interrelationship of the components is, as noted, shown schematically in FIG. 5. The head assembly 27 includes a support base 41 that is mounted for movement along the guide rails 34 and which supports a Z axis drive motor 42 having an encoder 43 that provides an output signal indicative of the position of the head assembly 27 along the Z axis. The Z axis drive motor 42 drives a feed screw (not shown) that has a connection to a ball nut of a pick up head, indicated generally by the reference numeral 44. The pick up head 44 is adapted to receive a pick up nozzle 45 of the vacuum operated type.

The pick up nozzle 45 is detachably connected to the pick up head 44 so as to provide replacement to accommodate various types of components, indicated generally by the reference numeral 46 that may be picked up by the pick up head 27.

The pick up nozzle 45 is also rotatable about a rotational axis R and is driven for this rotation by a rotational R axis servo motor 47. The rotational axis servo motor 47 also drives an encoder 48 so as to provide an output signal indicative of the rotational position of the pick up nozzle 45, for a reason which will be described.

Figure 3:
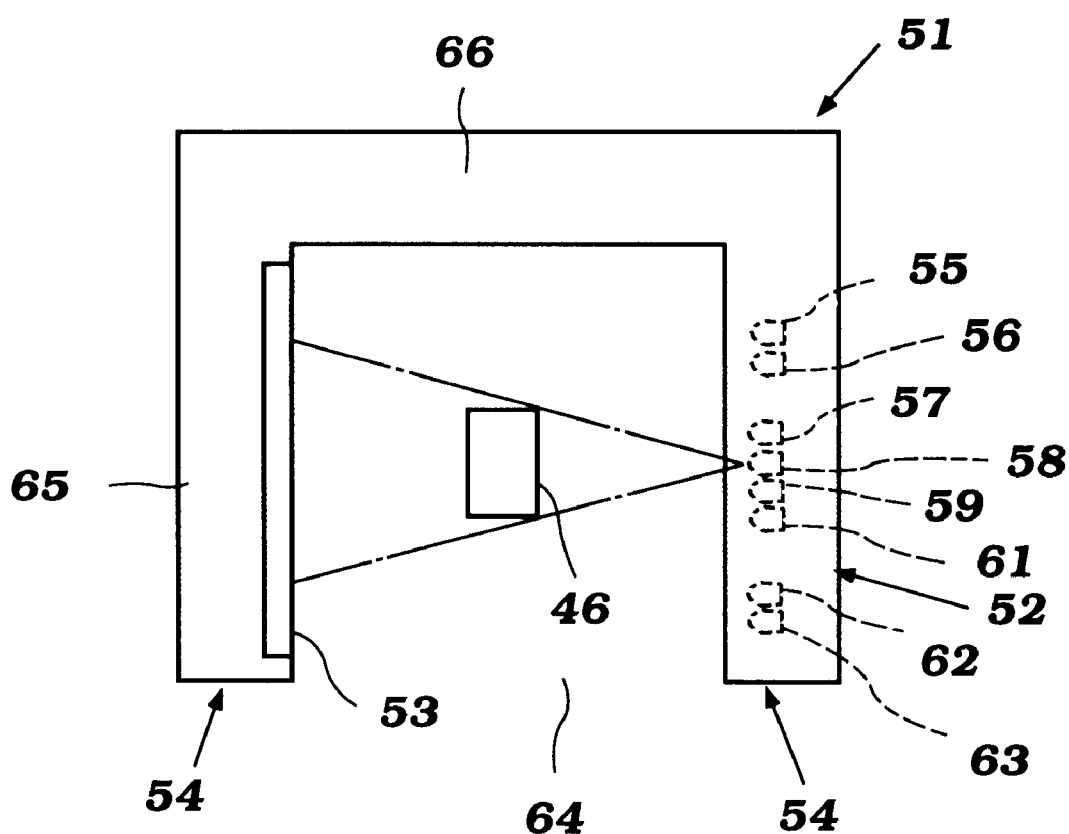
FIG. 3 is an enlarged top plan view showing the sensing station with a component position therein.
Figure 4:
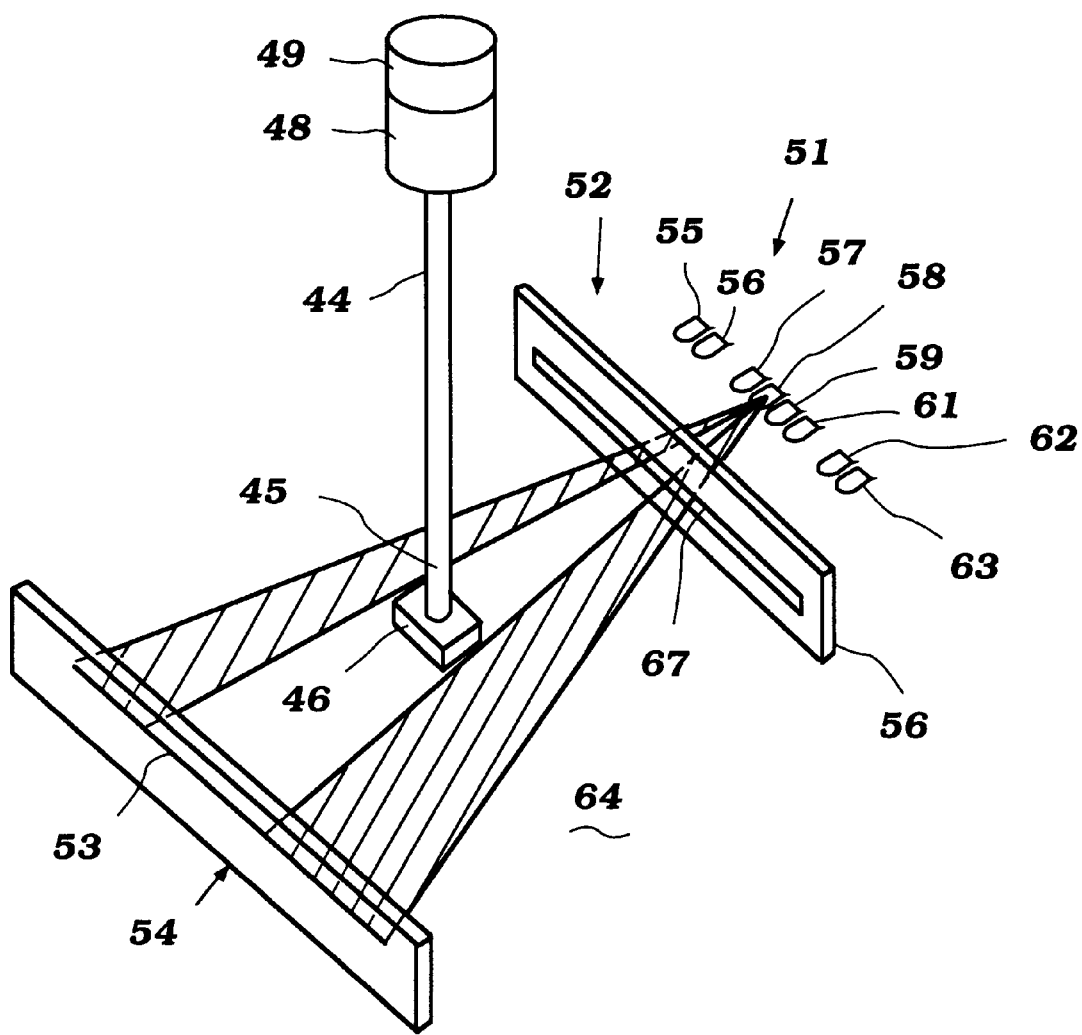
FIG. 4 is a perspective view showing partially schematically the sensing station.

Also mounted on the head assembly 27 and specifically the support base 41 is a sensor device, indicated generally by the reference numeral 51 which, in the illustrated embodiment, is an optical sensor that is comprised of a light source indicated generally at 52 that emits diffused light rays as shown FIGS. 3 and 4 to a detector or receptor unit in the form of a CCD 53. The detector unit 53 functions, as will become apparent, so as to sense objects which obscure the light rays as determined by the output of the sensor 51. The output of the sensor 51 is transmitted to the control unit 33 (FIG. 5).

The construction of the sensing station 51 is shown best in FIGS. 3 and 4. It will be seen that this includes a frame member 54 that has a generally C-shaped configuration with the light source 52 being mounted on one leg 55 thereof. The light source 52 is, in fact, a plurality of individual diode light elements (LED's) arranged in an array and indicated by the reference numerals 55, 56, 57, 58, 59, 61, 62, and 63, respectively. These light sources emit a diffused light toward the receptor 53 across a gap 64 formed between the leg 54 and a leg 65 on which the receptor 53 is mounted. The components 46 are disposed therebetween in an orientation as will be described.

The legs 54 and 65 are connected together by a bridging leg 66 formed at one side of the gap 64. It will be seen that the leg 54 has a face that is defined with a slot 67 that restricts the light rays emitting from the LED's 55, 56, 57, 58, 59, 61, 62, and 63 to an area that will encompass the height of the component 46 when the pickup nozzle 45 is located in the sensing station 51 and specifically across the gap 64. This eliminates stray light rays and provides a more accurate signal and indication of the condition of the component 46 relative to the pickup nozzle 45.

The manner in which the sensing device 51 provides information which can be utilized to calculate the orientation of the component 46 relative to the pickup nozzle 45 will be described by reference primarily to FIGS. 6–12. Basically, the concept operates by providing a light ray that extends across the gap 64 so that the component 46 will cast a shadow on the receptor 53 with the non-obscured light rays indicated by the hashed arcs shown in FIG. 4. By shifting of this shadow along the receptor 54 by, in effect, moving the light source relative to the component 46 from one lateral position to another along the XX-axis it is possible to generate sufficient information so as to determine the orientation of the components.

This may be done by locating one edge of the component 46 and by shifting the light source by illuminating one and then another transversely spaced of the diodes 55–59 and 61–63, as will be described by reference to FIGS. 6–12. Although adequate information may be obtained by only sensing one corner of the component, more accurate locations can be determined by sensing two and in some instances three corners of the component.

In describing these figures, certain legend are applied which will now be described. It will be seen that the centers or origins of the light from the diodes 55–59 and 61–63 is disposed along a line L1 which is parallel to a line L2 that contains the face of the CCD receptor 53 and thus is parallel to it.

The pickup nozzle 45 is mounted, by the head assembly 41 so that these lines are parallel and that the nozzle center indicated at Cn is located at a known distance between the lines L1 and L2. The center of the nozzle Cn can be assumed to be the origin point O,O along the X and Y axes which axes are indicated respectively by the line Rc which extends in the YY direction and passes through the point Cn and the origin OO and the line Ro which is perpendicular to the line Rc and also passes through the nozzle center Cn. In the specific example, the line Ro or the Y-axis origin line passes through the diode 58 and an origin point O lying on the receptor 53.

The center of the component 46 as picked up is indicated at the point Cc which has an unknown location Xo,Yo in the X and Y axes directions. It should be noted that the component 46 is illustrated as being a rectangular-shaped component, as is true with a large number if not all of the components. Also the component is shown in an offset condition relative to the nozzle axis Cn as occurs in actual production conditions.

The method deals primarily with locating one and as has been noted preferably two or three corners of the component by the reflections or shadows cast on the receptor 53. The three sensed or located corners are indicated at P1, P2 and P3 in the figures. The corners P1 and P2 are diametrically opposite and are disposed on the long side of the component 46. The respective X and Y coordinates of the corners P1, P2, and P3 are designated at $X_1, Y_1, X_2, Y_2$, and $X_3, Y_3$. By illuminating first one of the light sources 55 or 56 and in the example the light source 55, the light rays will cast a shadow from the corner P1 which falls at the point L1 on the receptor 53. This point has a position on the receptor which lies along the Y axis. Using the line L1 as the origin, the distance M between the lines L1 and L2 and distance Mo between the lines L1 and the center of the nozzle Cn are known. These are dimensions along the X axis.

Also, the positions of the various diode light source centers 56–59 and 61–63 in the Y-axis direction may be expressed as Le1, Le2, Le3, Le4, Le5, Le6, Le7, and Le8. Thus, very simple trigonometric relationships can be set out so as to determine easily the location of the point $P_1$ in the Y-axis coordinates. The following relationships hold true.

$$Xo=(X_1+X_2)/2 \qquad \text{Equation(1)}$$

$$Yo=(Y_1+Y_2)/2.$$

These equations hold true because of the center location of the point Cc is at the point Xo, Yo.

The angle θ at which the component 46 is rotated relative to the pickup nozzle Cn is equal to the angle of the line connecting the edges $P_1$ and $P_3$. This is because of the rectangular configuration of the component. Therefore, this angle θ can be easily calculated by the trigonometric relationship since a right triangle is formed by a line containing the point $P_1$ and extending perpendicularly to the reference planes $L_1$ and $L_2$ and by a line intersecting this line and extending perpendicular to it through the point $P_3$. The line $P_1$–$P_3$ is the hypotenuse of this right triangle. Therefore, the length of the adjacent side $X_3$–$X_1$ and the opposite side $Y_3$–$Y_1$ are equal to the following:

$$\tan\theta=(Y_3-Y_1)/(X_3-X_1) \qquad \text{Equation(2)}$$

$$\theta=\arctan (Y_3-Y_1)/(X_3-X_1)$$

Thus, these equations give the adequate information to determine the correction factors that should be applied when the component 46 is placed if the locations of the respective corners $P_1$, $P_2$, and $P_3$ can be determined. The manner by which this is done is by selectively illuminating the light source so as to shift the shadows cast by the edges on the receptor 53 and then calculate the locations in accordance with the method which will be set out below.

Figure 5:
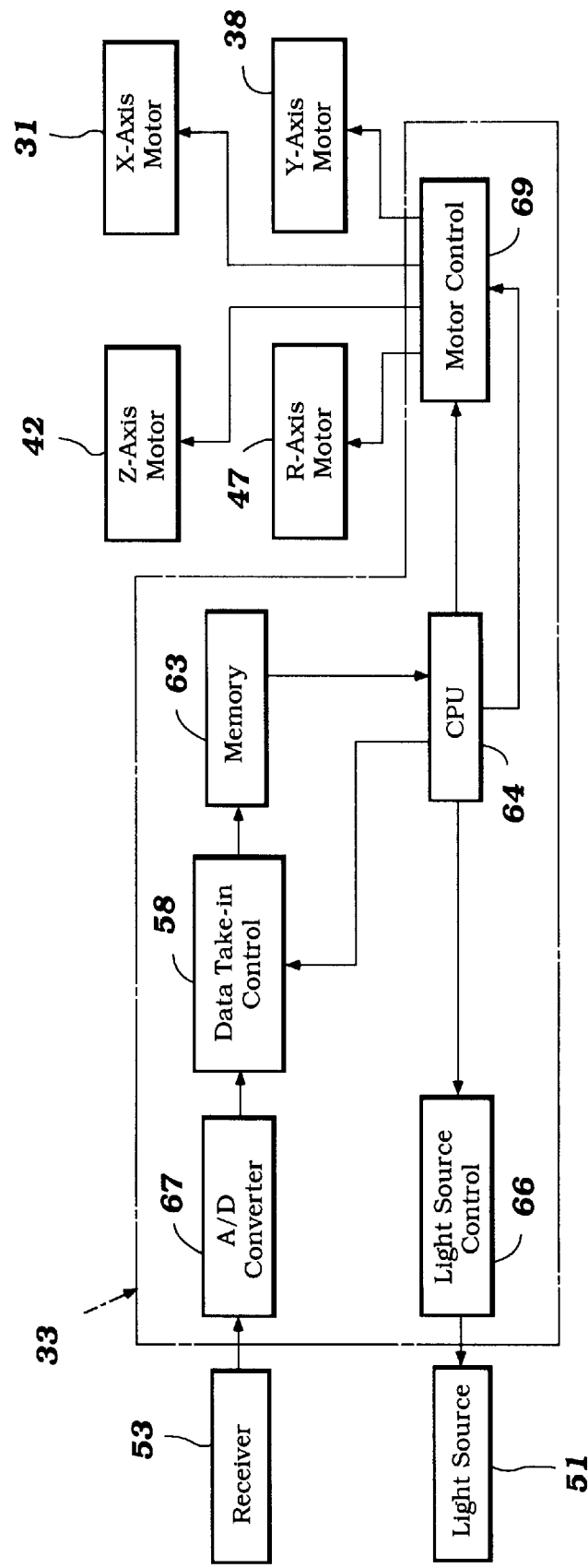
FIG. 5 is a block diagram showing the relationship of the various components of the system.

Before describing this method further, the apparatus which has been previously referred to and which is shown in FIG. 5 will be described particularly. As noted, the apparatus includes a control 33 and this includes as a base component, a CPU 64 and associated memories 65. The CPU 64 controls the light sources through a light source control section 66 of the control 33. This illuminates the various LED's 55–59 and 61–63 in the sequence which will be described. In addition, the receiver 53 outputs data indicative of the shadows to the control 33 and specifically to an analog to digital (A/D)converter 67 thereof. This analog digital converter outputs its digital signals to a data take-in control section 68 which is controlled by the CPU 64 and which outputs its data to the memory 65.

The CPU 64 then computes from the accumulated data the corrections required to correctly position the component and output signals to a motor control section 69. This motor control section controls the X,Y,Z and R-axes motors 31, 38, 42, and 47 so as to appropriately position the component and to correct the position for final positioning on the printed circuit board or substrate 22. The method and structure by which the actual positioning is of the type known in this art and can be practiced by any of the known placement apparatus.

Figure 6:
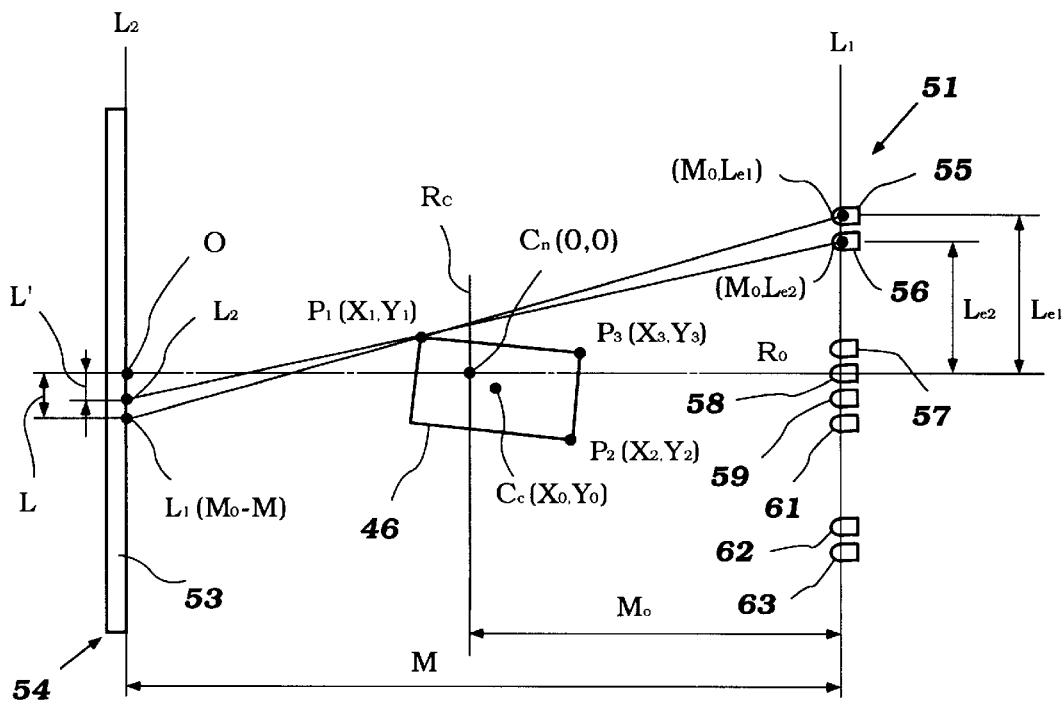
FIGS. 6–12 are top plan views utilized to explain the sensing methodology.

Referring now back to FIGS. 6–12, the mathematical calculations and methodology will be described in more detail. First, and as seen at FIG. 6, the corner location $P_1$ is determined by illuminating first the LED 55 and then collecting data from the shadow point $L_1$. Subsequently, the LED 56 is illuminated and the shadow point $L_2$ is determined. These give the offset points at the distances L and L' from the origin axis O and hence will provide Y-axis coordinate data.

As has been previously noted, the distances Le1 and Le2 from this reference plane are also known from the positioning of the LED's 55 and 56. The light lines that define the points Le1 and L1 and Le2 and L2 define two right triangles and the point $P_1$ $(X_1, Y_1)$ lies on the hypotenuse on each of these night triangles. Hence, the following relationships hold true:

$$(M_o-X_1))/M=(Le1-Y_1)/(Le1-L_1) \qquad \text{Equation (3)}$$

$$(M_o-X_1))/M=(Le2-Y_1)/(Le2-L_2)$$

These equations represent the relationship between the two segmented triangles contained within the two major triangles. It should also be noted that in the example shown the value of $X_1$ has a negative sign.

Thus, by solving these equations it is possible to obtain the values of both $Y_1$ and $X_1$, i.e., the corner coordinates of the point $P_1$ as follows:

$$Y_1=(Le1*L2-L_2*Le1)/[(Le1-L_2)-(Le2-L_1)] \qquad \text{Equation(4)}$$

$$X_1=M_o-M*(Le1-Le2)/[(Le1-L_1)-(Le2-L_2)]$$

Having thus calculated the actual position of the corner point $P_1$ and its X and Y coordinates and the angle θ of the component 46 relative to the nozzle 45 it is actually possible to make all of the necessary corrective factors. However, for assurance it is also desirable to locate the X and Y positions of one or more remaining corners.

Figure 7:
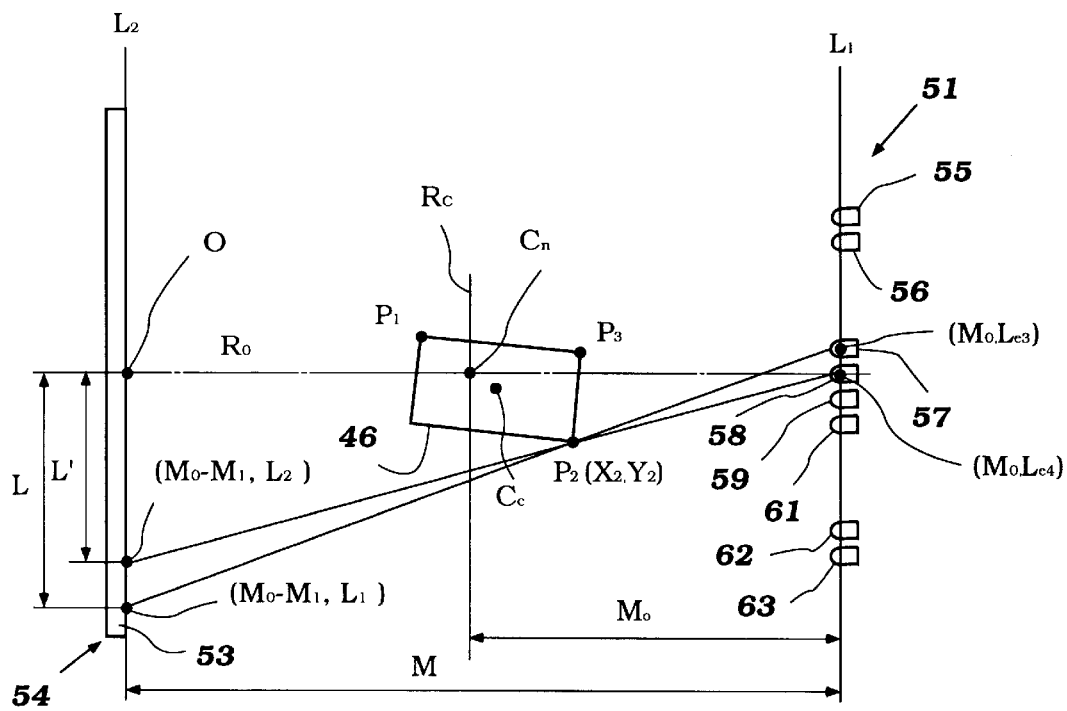

FIG. 7 illustrates how the location of the corner coordinates $X_2$ and $Y_2$ of the corner $P_2$ can be determined. This is done by again illuminating two different light sources or in effect moving the source of light laterally along the Y axis to cast two different shadow points also indicated at L1 and L2 in FIG. 7 from the corner point $P_2$. This particular embodiment utilizes the LED's 57 and 58 to cast the shadows. These calculations are made by the same theory previously applied following the following equations, the first of which, Equation 5, sets forth the relationships for determining the ratios and the second, Equation 6, being the solution of those to find the coordinates $Y_2$ and $X_2$. These equations follow those set out above and are as follows:

$$(M_o-X_2))/M=(Le3-Y_2)/(Le3-L_1) \quad \text{Equation(5)}$$

$$(M_o-X_2))/M=(Le4-Y_2)/(Le4-L_2)$$

$$Y_2=(Le3*L2-L_1*Le4)/[(Le3-L_1)-(Le4-L_2)] \quad \text{Equation (6)}$$

$$X_2=M_o-M*(Le3-Le4)/[(Le3-L_1)-(Le4-L_2)]$$

Finally, the coordinates $X_3$ and $Y_3$ of the remaining corner point $P_3$ can be determined by a similar method consisting of utilization, in this embodiment, the light sources (LED's) 59 and 61. This methodology being shown in FIG. 8. As seen in this figure, the light sources cast two shadow points indicated by the previous designations and the similarity equations corresponding to equations (3) and (5) follow for this embodiment to result in:

$$(M_o-X_3))/M=(Le5-Y_3)/(Le5-L_1) \quad \text{Equation(7)}$$

$$(M_o-X_3))/M=(Le6-Y_3)/(Le6-L_2)$$

Thus, by solving these equations, the corner coordinates can be found in the same manner as previously set forth in equations (4) and (6) by utilizing the following equations:

$$Y_3=(Le5*L2-L_1*Le6)/[(Le5-L_1)-(Le6-L_2)] \quad \text{Equation(8)}$$

$$X_3=M_o-M*(Le5-Le6)/[(Le5-L_1)-(Le6-L_2)]$$

Thus, it is possible by this method to determine the accurate locations of the corner points and the angular orientation of the component 46 relative to the pickup nozzle portion 45 and thus make the necessary correction factors ΔX, ΔY and the rotational angle correction value Δθ from these calculated values.

Figure 8:
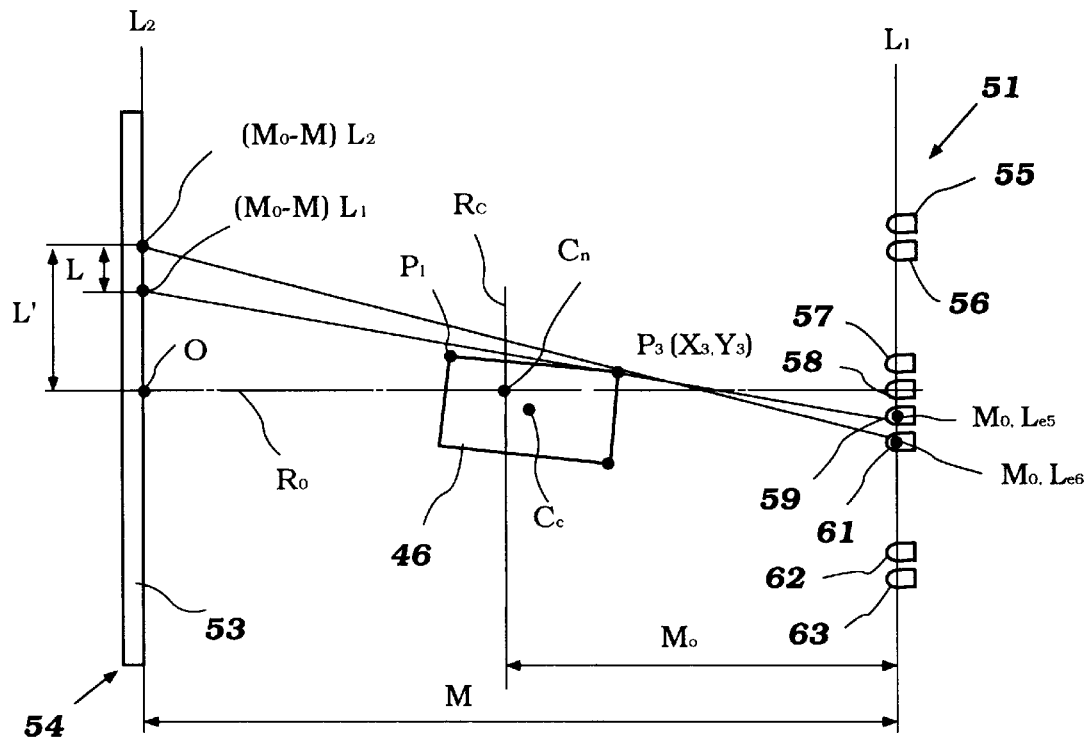
Figure 9:
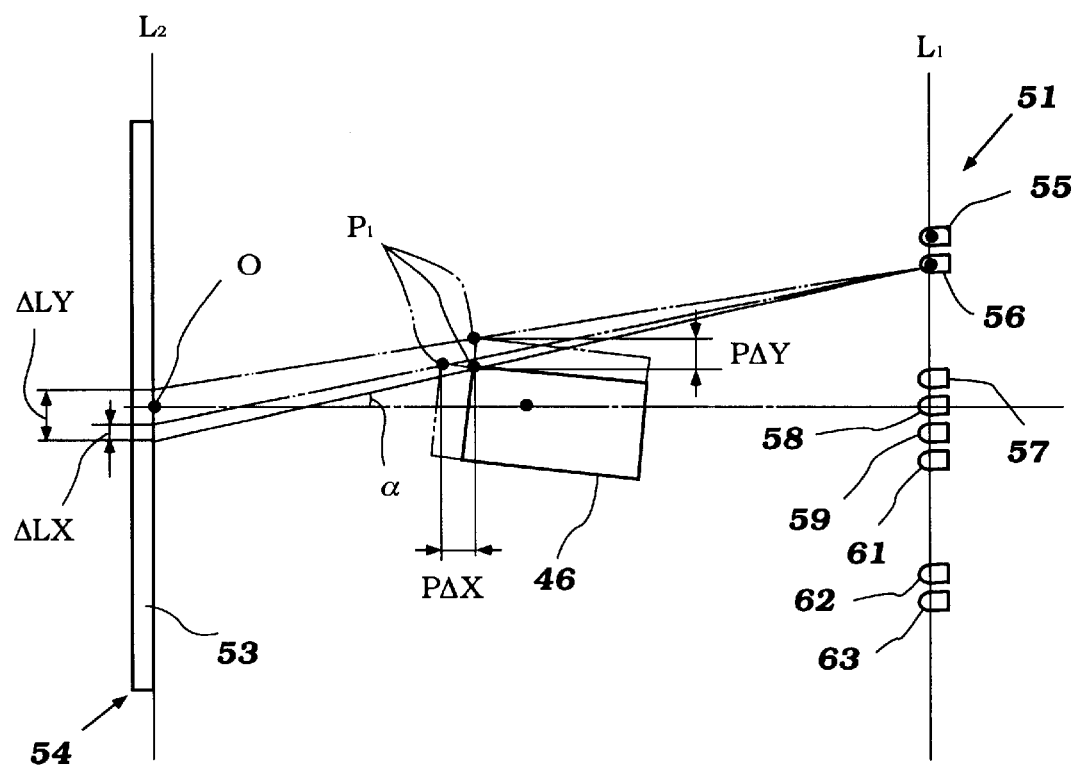

Although this methodology provides good data, there are some situations where there may be a significant difference between the accuracy of determination of the X-axis coordinate relative to the Y-axis coordinate and this can be understood by reference to FIG. 9. FIG. 9 shows the relationship employed in FIGS. 6–8 but shows the component 46 displaced equal amounts in the X and Y axes directions so that the point P1 is shifted to new points shown in the dotted line positions. As has been noted, the ΔX offset is chosen equal to the ΔY offset in the two shifted positions so as to show how the difference in accuracy can result. In this condition, it will be seen that the sight line from the LED 56 indicated by the angle α when the ΔX offset has been accomplished is quite small. Then, the positional variation of the point ΔLX is quite small compared with the positional variation ΔLY when an equal offset is applied to the Y axis.

Figure 10:
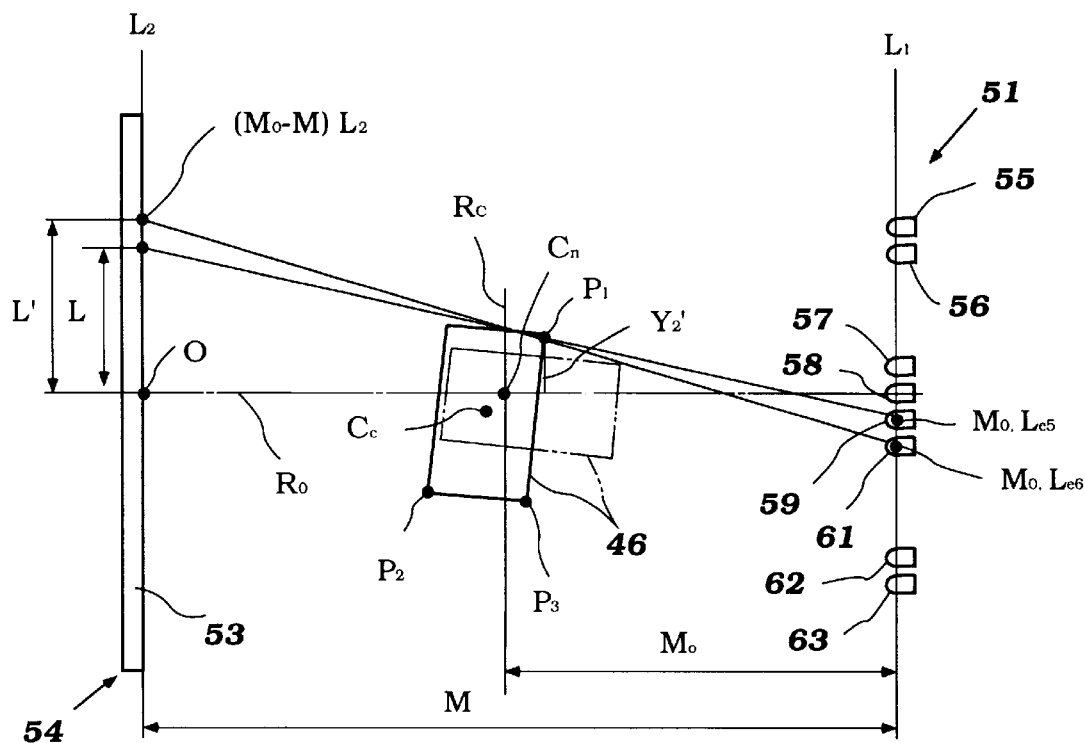
Figure 11:
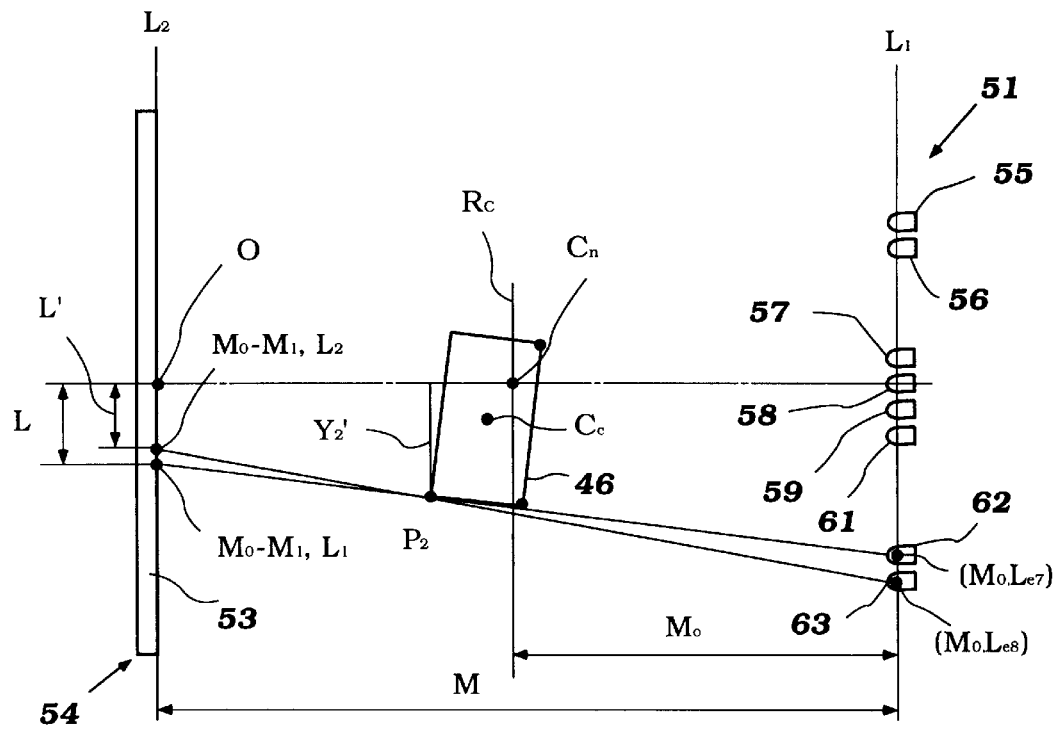
Figure 12:
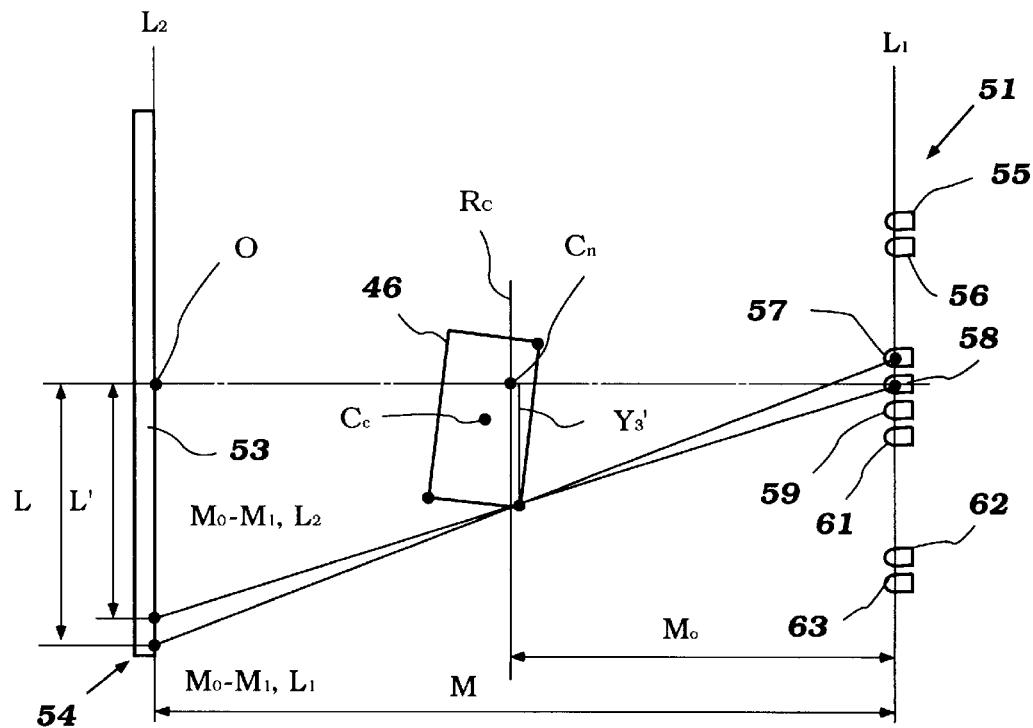

Thus, in situations where this may be a problem or a possibility, the coordinates in the X direction are found more accurately by rotating the nozzle member 45 and the component 46 through 90° from the states shown in FIGS. 6–8 to the states shown in FIGS. 10–12. In essence, the procedure is that the methodology utilized in FIGS. 6–9 is employed to calculate only the Y axis coordinates of the component 46 when in the position so that the long dimension of the component extends along the X axis. The component is then rotated through 90° and the new Y axis coordinates are calculated but these coordinates are actually equivalent to the X axis coordinates due to the rotation of the component.

In other words, the coordinate system may be considered to be the thing which has been rotated rather than the component even though physically it is the component that is rotated. Therefore, the new Y axis components are calculated in accordance with the steps shown in FIGS. 10–12 wherein again alternate light sources are illuminated so as to measure the corner components $P_1$, $P_2$, and $P_3$ respectively in these new orientations as shown in FIGS. 10,11 and 12. The same methodology is employed and the equations utilized in each condition are as follows.

In FIG. 10, equations 9 and 10 are employed as follows.

$$(Mo-X_1')/M=(Le5-Y_1')/(Le5-L1) \quad \text{Equation(9)}$$

$$(Mo-X_1')/M=(Le6-Y_1')/(Le6-L2)$$

and $$Y_1'=(Le5*L2-Le6*L1/[(Le5-L1)-(Le6-L2)] \quad \text{Equation(10)}$$

Thus, the X component of the corner P1 before rotation may be expressed as follows:

$$X_1=-Y_1' \quad \text{Equation(11)}$$

In a similar manner and as shown in FIG. 11, sources 62 and 63 are illuminated so as to locate the corner position P2 by the shadow and calculate the Y-axis coordinates for the corner P2 in accordance with the following equations:

$$(Mo-X_2')/M=(Le7-Y_2')/(Le7-L1) \quad \text{Equation(12)}$$

$$(Mo-X_1')/M=(Le6-Y_1')/(Le6-L2)$$

Having these equations, then the coordinates can be solved as follows:

$$Y_2'=(Le7*L2-Le8*L1/[(Le7-L1)-(Le8-L2)] \quad \text{Equation(13)}$$

Thus, the X coordinate of the coordinate corner P2 before rotation is given by the following equation:

$$X2=-Y2' \quad \text{Equation(14)}$$

Finally, in FIG. 12, the remaining corner P3 is measured so as to determine its new Y axis coordinates in accordance with the following equations:

$$(Mo-X_3')/M=(Le3-Y3')/(Le3-L1) \quad \text{Equation(15)}$$

$$(Mo-X_3')/M=(Le4-Y3')/(Le4-L2)$$

This equation is then solved by the following equation to obtain the new Y-axis coordinate:

$$Y_3'=(Le3*L2-Le4*L1/[(Le3-L1)/(Le4-L2)] \quad \text{Equation(16)}$$

Then, the Y-axis coordinate before rotation is determined by the following equation:

$$X_3=-Y_3' \quad \text{Equation(17)}$$

Thus, the X- and Y-axes coordinates of the component 46 can be very accurately determined and the degree of accuracy is the same for both directions by this methodology.

Having this background in mind, the manner of operation of the apparatus to pickup a component 46 from a respective feeder station 25 and specifically a specific feeder 26, position it over the printed circuit board 22 and position it will be described.

Figure 13:
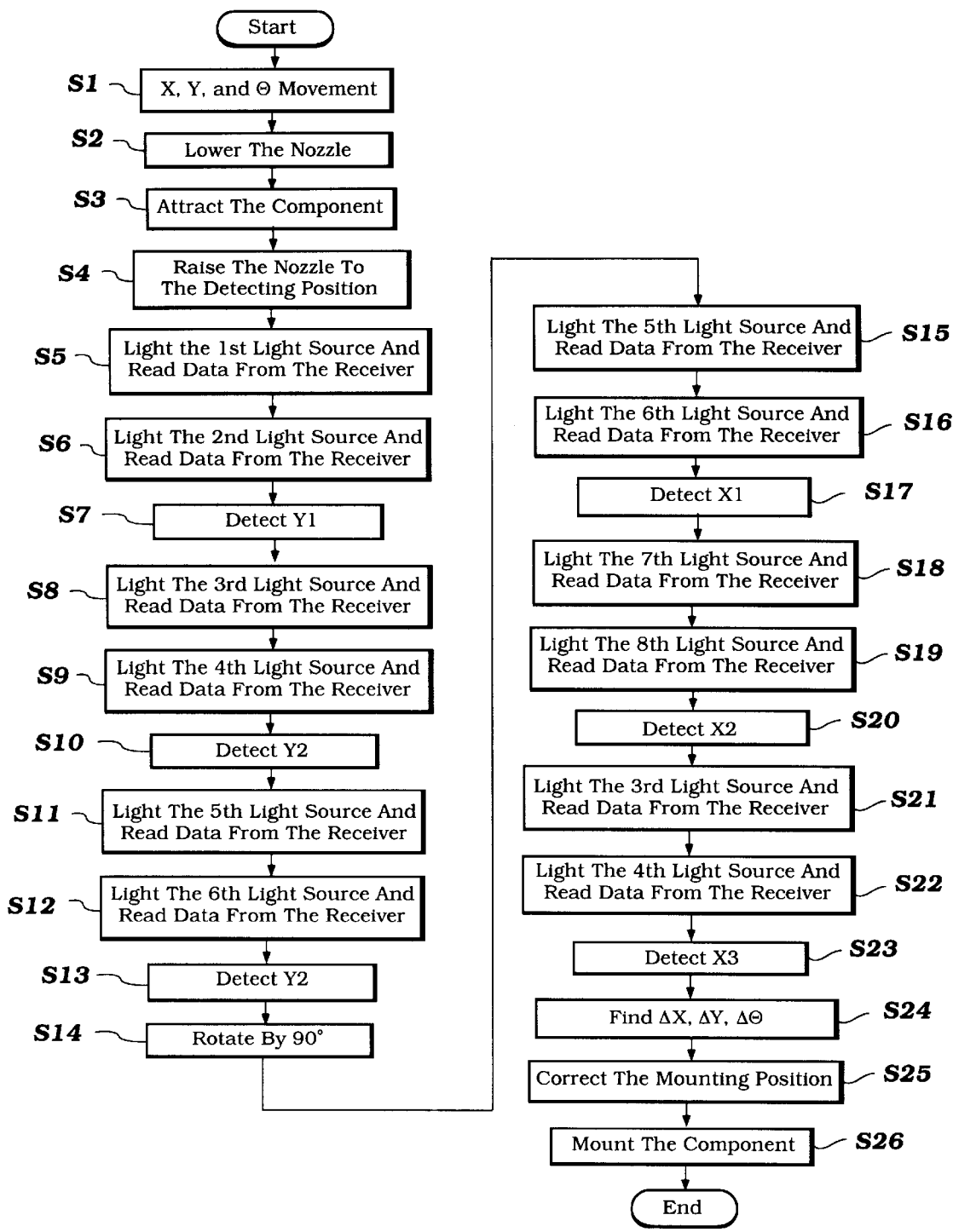
FIG. 13 is a block diagram showing the control routine.

As seen in FIG. 13, the program starts and moves to the step S1 so that the X and Y axes motors 31 and 38 are energized so as to move the mounter head 27 to the appropriate position in registry with the feeder 26 from which the selected component will be picked up. The Z-axis and R-axis servomotors 42 and 47 are operated at the same time so as to place them in the appropriate position for pickup.

When the head 27 is determined to be in its appropriate position, the controller 33 operates the Z-axis servomotor 42 so as to lower the nozzle 45 into registry with the component 46 to be picked up.

At the appropriate lowered location, the pickup nozzle 45 is energized so as to exert a vacuum on it and attract the component 46.

The program then moves to the step S4 so as to raise the nozzle 45 and picked up component 46 to place it into the detecting station 51. At the same time this is occurring, the apparatus may be operated so that the mounting head 27 begins to move toward the position where the component is to be mounted. That is, the following detection steps indicated at S5 through S24 can be performed on the fly toward the mounting location.

In accordance with the procedure, at the step S5 the first LED of the array 55–59 and 61–63 is illuminated. In the specific example described, these would be the LED 55 at the step S5 and the LED 56 at the step S6. The data would be read at each step and then at the step S7, the $Y_1$ coordinate of the corner P1 is calculated in accordance with the method described.

The program then moves to the steps S8 and S9 wherein the next pair of LED's are illuminated so as to sense the next corner, this being the corner P2 as shown in FIG. 7, in the aforedescribed embodiment. In these steps, the LED's 57 and 58 are illuminated and the data read and collected.

The program then moves to the step S10 so as to calculate the $Y_2$ coordinate of the corner P2 in accordance with the routine and calculation methods previously described.

The program then moves to the steps S11 and S12 so as to illuminate the next series of light sources, these being the LED's 59 and 61 in the described embodiment, as shown in FIG. 8. This is to detect the position of the corner P3 and in accordance with the preferred methodology, to determine the $Y_3$ coordinate of this corner.

Having collected the data at the steps S11 and S12, the calculation of the $Y_3$ position is performed at the step S13.

The program then moves to the step S14 wherein the component 46 is rotated through 90°. In accordance with the methodology described in conjunction with FIGS. 10, 11, and 12, this rotation is done in the clockwise direction.

Once the rotation in this direction is completed, then the position of the corner P1 is again determined by illuminating, as seen in FIG. 10, the LED's 59 and 61. This occurs at the steps S15 and S16.

Having collected the data, the program moves to the step S17 so as to detect the $X_1$ coordinate of the corner P1 utilizing equations 9, 10, and 11, as previously mentioned.

Having thus detected the coordinate $X_1$ of the corner P1, the program moves to the step S18 and S19. In the described embodiment, this follows the routine shown in FIG. 11 wherein the LED's 62 and 63 are illuminated to determine the coordinate $Y_2'$ of the corner P2. This dimension will then be converted into the $X_2$ coordinate.

After the LED's 61 and 62 have been illuminated at the steps S18 and S19 and the data collected, the program moves to the step S20. Then, utilizing the equations 12 and 13 the $Y_2'$ calculation is made and this is converted using equation 14 to the $X_2$ coordinate for this corner.

The program then moves to the steps S21 and S22 so as to perform the methodology, in the described embodiment, shown in FIG. 12 where the LEDs 57 and 58 are illuminated sequentially. This permits obtaining of the data of the corner position P3 to determine its $Y_3'$ location.

Having collected this data, the program moves to the step S23 so as to calculate the $X_3$ coordinate first using the equations of equations 15 and 16 and finally to convert the $Y_3'$ coordinate into the $X_3$ coordinate utilizing equation 17.

Thus, having accurately determine the X and Y coordinates of the corners P1, P2, and P3 relative to the nozzle center and the angle θ, the program moves to the step S24 so as to calculate the corrective amounts ΔX, ΔY, and Δθ to compensate for the misalignment in the component 46 as picked up by the nozzle 45.

Having made these calculations, the program moves to the step S25 to make a final calculation in the X, Y, and θ rotational and translational positions for the nozzle 45 so as to be positive on the component. This is done by rotating the various servomotors and then operating the Z-axis servomotor to lower the component. The component is then mounted at the step S26 by discontinuing the vacuum and the apparatus is retracted.

This apparatus provides an arrangement for conveniently measuring the location of the component and determining the offsetting calculations to be made so that it can be accurately positioned. This apparatus differs from the conventional apparatus in that the actual time for measuring is consistent regardless of the positioning of the component. With prior art constructions, it may have been necessary to determine a minimum angle position initially before the detection apparatus can begin its actual detecting method and this time can vary. Since no additional rotation is required with this arrangement, the timing can be constant and this can assist in the setup of the total apparatus.

Also, it is to be understood that the described methodology involves taking measurements at two different angles but depending upon the type of component, this may not be required. It is required primarily if the component departs from a square configuration in a substantial amount, i.e., if one side is substantially longer than the other side. Also, the number of light detectors required can be changed from those described and it is not necessary to utilize eight detectors as described. That is, the number of detectors can be either reduced or increased depending upon the structure sensed.

Also, the device has been described as sensing individual corners separately. It may be possible in some instances to measure the information regarding two corners simultaneously. Also, it is not necessary to measure all three corners if the component is known to have certain specific orientation and geometric relationships a lesser number of corners can be measured. Various other changes and modifications may be made without departing from the spirit and scope of the invention, as defined by the appended claims.

What is claimed is:

1. A method for optically determining the position of a component picked up by a pickup device comprising the step of positioning the pickup device and a held component in a sensing station between a light receptor and a diffusion-type light source spaced at a known transverse distance so that the light source can cast a shadow caused by the component upon the receptor, moving of the origin of the light source relative to the component in a direction parallel to the plane of the receptor for effecting a shifting the edge of the shadow on the receptor, and calculating from the shifting of the shadow the location of an edge of the component.

2. The method for optically determining the position of a component as set forth in claim 1, wherein the component is a polygonal component.

3. The method for optically determining the position of a component as set forth in claim 1, wherein the coordinates of at least one corner of the component are calculated.

4. The method for optically determining the position of a component as set forth in claim 3, wherein the coordinates of at least two corners of the component are calculated.

5. The method for optically determining the position of a component as set forth in claim 4, wherein the coordinates of at least three corners of the component are calculated.

6. The method for optically determining the position of a component as set forth in claim 5, wherein the angle of the component relative to the pick up device is also calculated.

7. The method for optically determining the position of a component as set forth in claim 1, wherein the angle of the component relative to the pick up device is calculated.

8. The method for optically determining the position of a component as set forth in claim 1, wherein the light source is moved relative to the component.

9. The method for optically determining the position of a component as set forth in claim 8, wherein there are a pair of spaced light sources and these light sources are illuminated sequentially for effecting the movement of the light source relative to the component.

10. The method for optically determining the position of a component as set forth in claim 9, wherein the component is a polygonal component.

11. The method for optically determining the position of a component as set forth in claim 10, wherein the coordinates of at least one corner of the component are calculated.

12. The method for optically determining the position of a component as set forth in claim 11, wherein the coordinates of at least two corners of the component are calculated.

13. The method for optically determining the position of a component as set forth in claim 12, wherein the angle of the component relative to the pick up device is also calculated.

14. The method for optically determining the position of a component as set forth in claim 13, wherein different light sources are employed for illuminating different corners.

15. The method for optically determining the position of a component as set forth in claim 12, wherein the coordinates of at least three corners of the component are calculated.

16. The method for optically determining the position of a component as set forth in claim 15, wherein there are different light sources provided for each of the corners.

17. The method for optically determining the position of a component as set forth in claim 1, wherein one of a pair of rectangular coordinates is measured by the described method when the component is held in a first angular rotation and the other coordinate is determined when the component is rotated through an angle to a second position by the same method.

18. The method for optically determining the position of a component as set forth in claim 17, wherein the coordinates of at least two corners of the component are calculated each at a respective one of the angular positions.

19. The method for optically determining the position of a component as set forth in claim 18, wherein the coordinates of at least three corners of the component are calculated.

20. The method for optically determining the position of a component as set forth in claim 19, wherein the angle of the component relative to the pick up device is also calculated.

21. An apparatus for optically determining the position of a component picked up by a pickup device comprising a light receptor and a diffusion-type light source spaced from said receptor at a known transverse distance so that said light source can cast a shadow caused by the component upon said receptor, means for moving of the origin of said light source relative to the component in a direction parallel to the plane of said receptor for effecting a shifting the edge of the shadow on the receptor, and means for calculating from the shifting of the shadow the location of an edge of the component.

22. An apparatus for optically determining the position of a component as set forth in claim 21, wherein the light source comprises a plurality of discrete light sources and the means for moving the origin of said light source comprises means for sequentially illuminating said discrete light sources.

23. An apparatus for optically determining the position of a component as set forth in claim 22, wherein the discrete light sources are spaced from each other along a plane parallel to the receptor.

24. An apparatus for optically determining the position of a component as set forth in claim 23, wherein the discrete light sources comprise LED,s.

25. An apparatus for optically determining the position of a component as set forth in claim 24, wherein the receptor comprises a CCD.

* * * * *

UNITED STATES PATENT AND TRADEMARK OFFICE
CERTIFICATE OF CORRECTION

PATENT NO. : 5,900,940
DATED : May 4, 1999
INVENTOR(S) : Yasuaki Aoshima

It is certified that error appears in the above-identified patent and that said Letters Patent is hereby corrected as shown below:

<u>Column 12,</u>
Line 48, please replace -- LED,s -- with -- -LEDs- --.

Signed and Sealed this

Sixth Day of November, 2001

*Attest:*

NICHOLAS P. GODICI
*Attesting Officer*   *Acting Director of the United States Patent and Trademark Office*